(12) United States Patent
Alexandre

(10) Patent No.: US 8,469,166 B2
(45) Date of Patent: Jun. 25, 2013

(54) GROUND-BASED POWER SUPPLY SYSTEM FOR A TRANSPORTATION VEHICLE AND ASSOCIATED METHODS

(75) Inventor: Jean-Luc Alexandre, Aigremont (FR)

(73) Assignee: Alstom Transport SA, Levallois Perret (FR)

( * ) Notice: Subject to any disclaimer, the term of this patent is extended or adjusted under 35 U.S.C. 154(b) by 71 days.

(21) Appl. No.: 13/267,472

(22) Filed: Oct. 6, 2011

(65) Prior Publication Data
US 2012/0085610 A1 Apr. 12, 2012

(30) Foreign Application Priority Data
Oct. 7, 2010 (FR) ...................... 10 58154

(51) Int. Cl.
*B60L 9/00* (2006.01)
(52) U.S. Cl.
USPC ............................................ 191/10; 191/1 R
(58) Field of Classification Search
USPC ............................................................ 191/10
See application file for complete search history.

(56) References Cited

U.S. PATENT DOCUMENTS
2010/0052427 A1 3/2010 Andre et al.

FOREIGN PATENT DOCUMENTS
FR 2910391 A1 6/2008
GB 08267 A 0/1914

OTHER PUBLICATIONS

Sato F. et al: "Contactless Energy Transmission to Mobile Loads by CLPS—Test Driving of NA EV With Starter Batteries", IEEE Transactions on Magnetics, IEEE Service Center, New York, NY, US, vol. 33 No. 5, Sep. 1, 1997, pp. 4203-4205, XP011086420, ISSN: 0018-9464, DOI: 10.1109/20.619710.

*Primary Examiner* — Jason C Smith
(74) *Attorney, Agent, or Firm* — Dowell & Dowell, PC

(57) ABSTRACT

The ground-based electric power supply system (1) for a transportation vehicle (T), includes:
a transportation vehicle (T),
a plurality of elements (4) emitting an electromagnetic field in order to power the transportation vehicle (T) by induction, the emitting elements (4) being positioned and spaced apart from each other along the circulation track of the transportation vehicle (T),
a device (5) for receiving the energy emitted by the plurality of emitting elements (4), borne by the transport vehicle (T),
means (6) for electrically powering the plurality of emitting elements (4) selectively, the means (6) being laid out so as to electrically power at least one emitting element (4) when the vehicle (T) is located above said at least one emitting element (4), characterized in that the length (L) of the receiving device (5) measured in the direction of circulation of the vehicle, is greater than the distance (D) which separates two consecutive emitting elements (4) along the circulation track.

19 Claims, 3 Drawing Sheets

Figure 1:
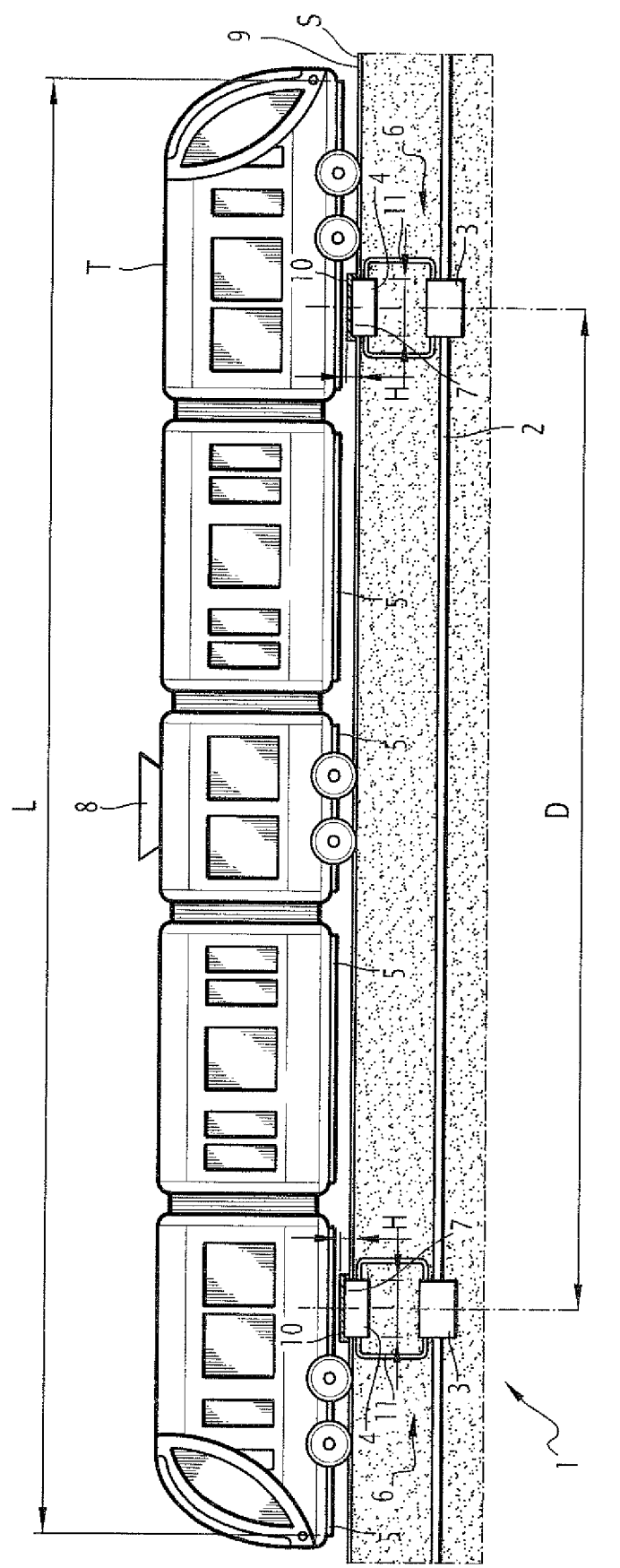

GROUND-BASED POWER SUPPLY SYSTEM FOR A TRANSPORTATION VEHICLE AND ASSOCIATED METHODS

BACKGROUND OF THE INVENTION

1. Field of the Invention

The invention relates to a system and to a method for supplying electric energy via the ground, in particular by induction, intended for a transportation vehicle in particular of the tram type. The invention also relates to a method for maintaining and servicing such a system.

2. Brief Description of the Related Art

There exist ground-based electric power supply systems allowing vehicles of the tram type to collect the electric energy of the system intermittently when the presence of the vehicle is detected.

Applications EP 0 979 176, FR 2 791 930, EP 1 043 187 and EP 2 088 025 for example describe such systems described as "APS" (French acronym meaning ground-based power supply) systems. According to the APS principle, the system includes a series of contact track segments insulated from each other and a permanently powered electric line extending parallel to the series of segments. Further, switching means are provided for independently and selectively connecting the contact track segments to the electric line, in particular so that a segment is only put into contact with the electric line when the vehicle is detected above this segment. The electric energy transmitted by the contact track segments is collected by conductive shoes located under the vehicle.

Such systems use contact power supply rails, which generate problems of wear of the materials and problems of reliability of the power supply related to bad weather to which the rails are subject such as storms, snow, rain, ice, sand and water. Moreover, the implementation of these systems in high traffic areas and at switches and crossings raises difficulties in installing and maintaining the systems.

Contactless ground-based power supply systems also exist, based on the principle of induction. Applications WO 2010/000494 and WO 2010/000495 for example describe a system for transferring electric power by induction to a vehicle, in which an emitting loop continuously emits an electromagnetic field via the ground, which is collected by a receiver placed under the vehicle so as to provide the vehicle with traction power or to recharge a battery present on the vehicle.

Such systems however have the drawback of permanently emitting a powerful electromagnetic field along the whole track, which generates energy losses and significant electromagnetic perturbations for the environment in which the systems are implanted. Further these systems make provision for the installation of the loop emitting the electromagnetic field all along the track, which makes such a system difficult to adapt to an already existing installation. Further, such systems impose the making of heavy infrastructures, and in particular provision is made for the presence of heavy copper loops along the track, which generate major problems in terms of congestion, installation and cost.

Finally, an overhead or ground-based electric power supply system without or with contact is known from application WO 2008/087287, which is capable of transmitting the energy to the vehicle intermittently by means of a plurality of power distribution elements. This document more particularly describes an overhead and contact power supply system, which is a particularly bulky system, not very aesthetical and complicated to install. It does not describe how to implement the ground-based induction system. Further, this document suggests powering the power distribution elements as soon as the transportation vehicle approaches these elements, which makes the system hazardous.

Such a system also has the other aforementioned drawbacks of contact power supply systems and further proves to be difficult to integrate in an optimal and aesthetical way in an urban environment.

SUMMARY OF THE INVENTION

Within this context, the invention is directed to proposing a ground-based electric power supply system for a transportation vehicle, which is optimum in terms of energy efficiency and reliability, while not being very disruptive and being of minimum bulk for implementation in its environment.

For this purpose, the object of the invention, according to a first aspect, is a ground-based electric power supply system for a transportation vehicle, the system including:
- a transportation vehicle, in particular of the tram type,
- a plurality of elements emitting an electromagnetic field for powering the transportation vehicle by induction, the emitting elements being positioned and spaced apart from each other along the circulation track of the transportation vehicle,
- a device receiving the energy emitted by the plurality of emitting elements, borne by the transportation vehicle,
- means for electrically powering the plurality of emitting elements selectively, the means being laid out so as to electrically power at least one emitting element when the vehicle is located above said at least one emitting element, the system being such that the length of the receiving device, measured in the direction of circulation of the vehicle, is greater than the distance which separates two consecutive emitting elements along the circulation track.

The system may also have one or more of the features below, considered individually or according to all the technically possible combinations:
- the receiving device extends under the transportation vehicle, in the area of its chassis, over more than 50% of its length, measured in the direction of circulation of the vehicle, better over more than 70% of its length, in particular between 80 and 100% of its length,
- the distance separating two consecutive emitting elements is comprised between half and two thirds of the length of the receiving device,
- the distance which separates two emitting elements is comprised between 10 and 40 m, and the length of the receiving device is comprised between 20 and 60 m,
- the means for electrically powering the plurality of emitting elements are laid out so that only the emitting element(s) located under the transportation vehicle are supplied with electric power,
- the means for electrically powering the plurality of emitting elements include at least one detector for detecting the presence of the transportation vehicle, for example positioned at at least one end of the transportation vehicle, in order to detect the arrival and/or the departure of the transportation vehicle above said at least one emitting element,
- the presence detector comprises on-board elements for emitting a presence signal indicating the presence of the transportation vehicle, positioned at the ends of the transportation vehicle and fixed elements for receiving the presence signal positioned in the vicinity of the emitting elements, the emitting elements are at least partly buried into the ground and include a portion protruding out of the ground, the emitting elements are located between the rails of the circulation track, the transportation vehicle includes at least one storage device supplied with power at least intermittently by the receiving device, the storage device includes an assembly of supercapacitors and/or a battery and/or an inertial flywheel.

According to a second aspect, the invention relates to a method for implementing the power supply system as defined earlier for electrically powering a transportation vehicle, the method being such that it includes the following steps:

electrically powering at least one emitting element when the vehicle is located above said at least one emitting element, the energy emitted by said at least one emitting element being collected by the receiving device in order to be used for the traction of the vehicle and/or in order to be stored in the storage device of the vehicle and/or for powering one or more auxiliary pieces of equipment, prevent electrical powering of said at least one emitting element when the vehicle is not located above said at least one emitting element.

By <<auxiliary piece of equipment>> is meant any device which is not intended for traction of the transportation vehicle. This for example may be a lighting or a heating device, inter alia.

According to a third aspect, the invention relates to a method for maintaining and servicing a power supply system as defined earlier, the method being such that it includes the step consisting of intervening on the system in order to modify and possibly replace at least one electric energy emitting element within a time interval allowing upkeep of the usual rate of the traffic in the absence of a maintenance and servicing intervention on the circulation track powered by the system.

The time interval is for example of a duration of less than 15 minutes, preferably less than 10 minutes, still preferably less than 5 minutes.

BRIEF DECSRIPTION OF THE DRAWINGS

Figure 2:
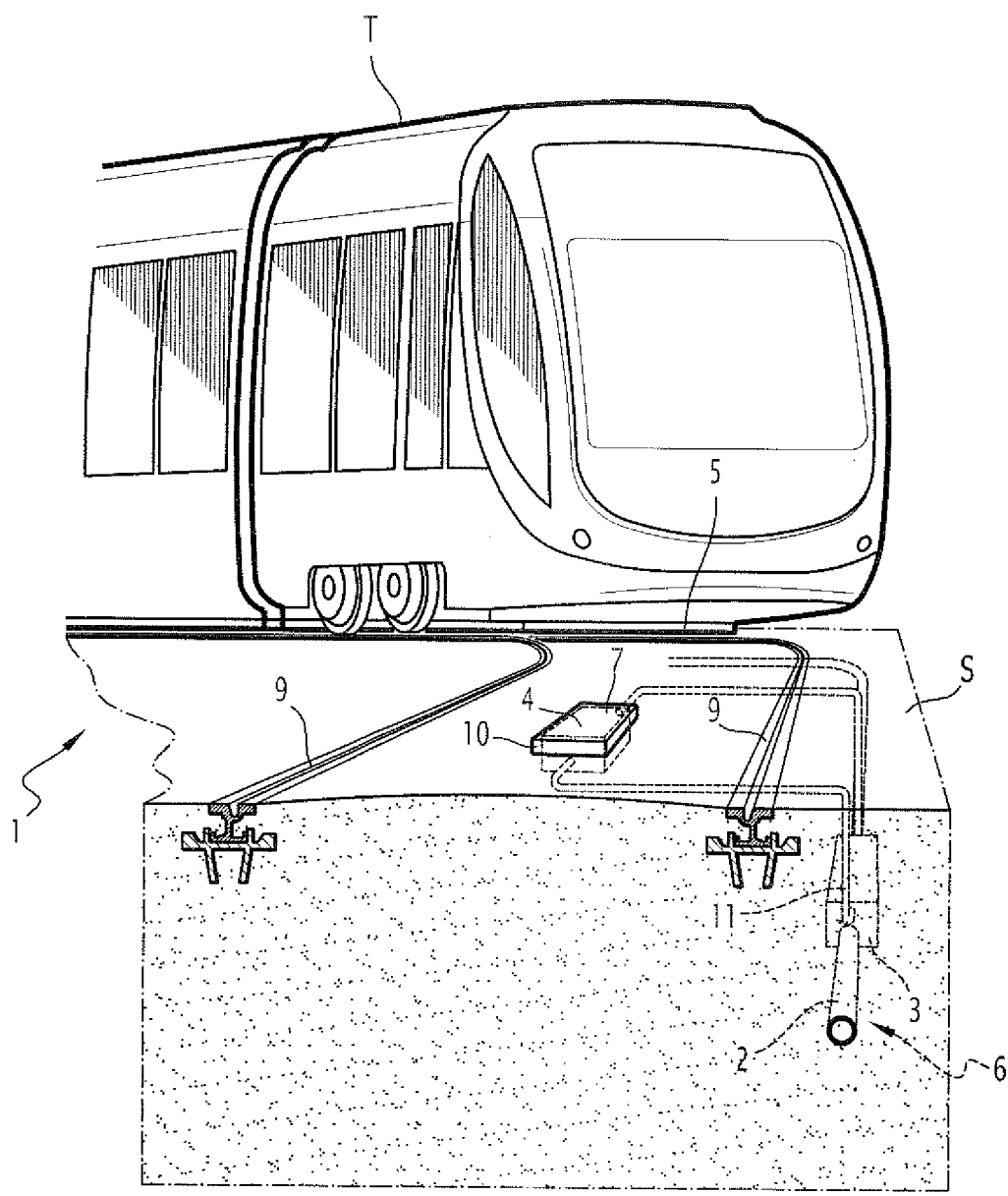
Figure 3:
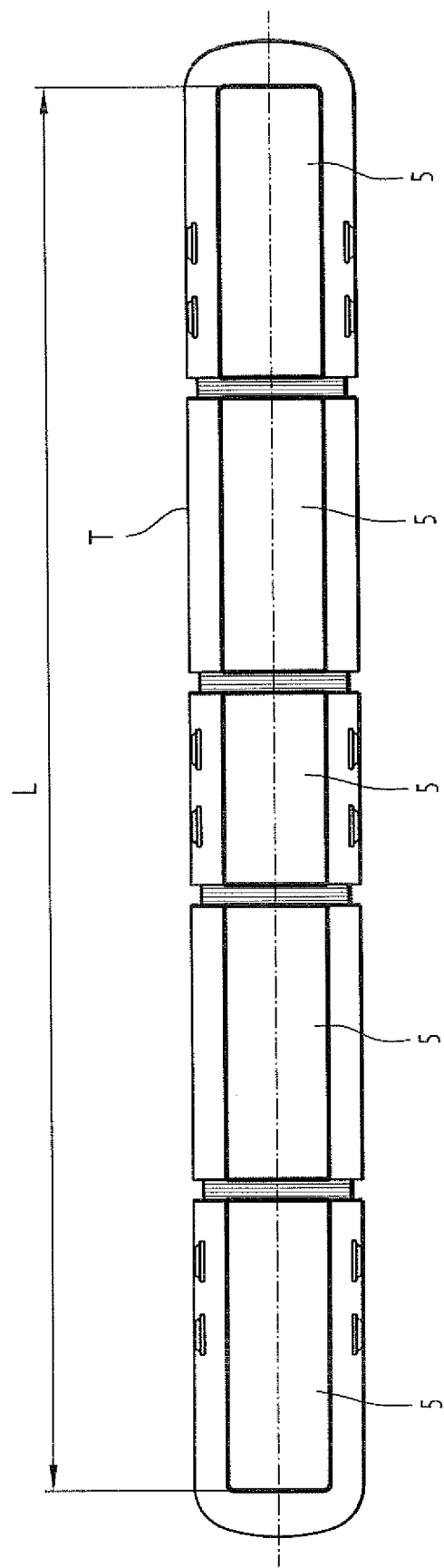

Other characteristics and advantages of the invention will become apparent from the description of an exemplary embodiment according to the invention which is given below as an indication and by no means as a limitation, with reference to the figures of the appended drawing, wherein FIG. 1 is a simplified schematic illustration of a ground-based electric power supply system according to the invention, FIG. 2 is another schematic and partial perspective illustration of the ground-based electric power supply system of FIG. 1, and FIG. 3 is a schematic and simplified bottom view of the transportation vehicle of FIG. 1.

DESCRIPTION OF THE PREFERRED EMBODIMENTS

FIG. 1 illustrates in a schematic and simplified way an example according to the invention of a system 1 for supplying electric power via the ground S for a transportation vehicle T.

The transportation vehicle T is for example a tram, a subway train or any other type of urban transportation vehicle. Alternatively, the transportation vehicle T is a vehicle circulating in extra-urban areas, such as a high-speed train. The transportation vehicle T in particular comprises at least one train, each train comprising at least two carriages jointed together.

The power supply system 1 includes elements 4 emitting an electromagnetic field for powering the transportation vehicle T by induction. The emitting elements 4 are distributed along the circulation track of the transportation vehicle T, between the rails 9 of the track.

The emitting elements 4 are at least partly buried into the ground S, between the rails 9 of the circulation track of the transportation vehicle T, as may be seen in FIG. 2. The emitting elements 4 include a portion 7 protruding out of the ground.

The emitting elements 4 include a protective material 10, for example in plastic, covering for example at least partly the emitting antennas. In this example, only the portions 7 protruding out of the ground are covered with the protective material 10.

The height H of the portion 7 protruding out of the ground covered with the protective material 10 is less than 5 cm, or even flush.

The emitting elements 4 have a length I, measured in the direction of the circulation of the transport vehicle T, comprised between 50 and 120 cm, for example equal to about 90 cm.

At least one presence detector is for example placed at each emitting element 4 for detecting the arrival and/or the departure of the transportation vehicle T above the emitting element 4. According to an embodiment, the presence detector consists of an element for emitting a presence signal indicating the presence of the transportation vehicle T, positioned at each end of the transportation vehicle T, and of an element for receiving the presence signal positioned at the emitting element 4. In particular, both of these functions, i.e. participation in the presence detection and emitter used for powering the vehicle, may be physically grouped in a same so-called power and control/monitoring casing.

The transportation vehicle T moreover includes a receiving device 5 for receiving the energy emitted by the emitting elements 4 and transferring it to the transportation vehicle T in the form of traction energy and/or storage energy.

The receiving device 5 is located under the transportation vehicle T, in particular in its central portion in the area of its chassis, and extends over the major portion of its length, i.e. over more than 50% of its length, preferably between 70 and 100% of its length, in particular substantially from one end to the other of the transportation vehicle T, as this may be seen in FIG. 3. Thus, the receiving device 5 has a length L substantially equal to the length of the transportation vehicle T, measured in the direction of circulation of the vehicle.

By <<receiving device>>, is meant a single and unique receiving device located under the transportation vehicle T or preferably an assembly of at least two separate receiving elements. In the present case, as this may be seen in FIG. 3, the receiving device 5 is made of a plurality of separate receiving elements, each receiving element for example extending under a body of the vehicle (car or carriage), in particular over the major portion of the length of the body of the vehicle, in particular between 70 and 100% of the length of the body of the vehicle.

In the embodiment of a receiving device consisting of a plurality of separate receiving elements 5, as illustrated in FIG. 3, it should be noted that said separate elements are electrically connected to each other through connecting elements not shown. These receiving elements 5 may be connected in series and/or in parallel.

In FIG. 3, it is understood that the elements 5 are successively positioned along the longitudinal axis of the whole of the transportation vehicle T, with one receiving element 5 per body. But provision may also be made within the scope of the invention for positioning several separate receiving elements 5 under the same body, either by positioning them successively along its longitudinal axis, or by positioning them parallel to each other along said axis, or further by positioning them in a still different way.

Thus, the plurality of receiving elements 5 electrically form a circuit, but are distinct.

The implementation of a receiving device in the form of separate receiving elements is advantageous. Indeed, it allows the receiving device to adapt to the relative movements between the different carriages when the transportation vehicle T circulates in a non-rectilinear portion of the circulation track, in particular in a turn. Indeed, the carriages are jointed together and each bear at least one receiving element.

The emitting elements 4 are spaced apart from each other by a distance D, which corresponds to the distance separating the central axes of two consecutive emitting elements 4. The distance D which separates two consecutive emitting elements 4 is comprised between half and two thirds of the length L of the receiving device 5 i.e. $L/2 \leq D \leq 2L/3$. This distance D is for example comprised between 15 and 20 m for a length L of the receiving device 5 equal to 30 m. Generally, the length of the receiving device 5 is comprised between 20 and 60 m, and the distance D separating two emitting elements 4 is comprised between 10 and 40 m.

A distance D comprised between half and two thirds of the length L of the receiving device 5 is particularly advantageous. Indeed, a distance D of less than half of the length L would force provision of a larger number of emitting elements which would increase the cost of the power supply system and would complicate the sequence for powering the emitting elements. Further, a distance D greater than two thirds of the length L would no longer be able to guarantee that there exists at any moment an emitting device positioned under the receiving device, and the continuity of the operation of the power supply system might be jeopardized. Therefore, a distance D comprised between half and two thirds of the length L of the receiving device 5 provides an ideal compromise between the cost of the power supply system and the reliability of the system, in particular the guarantee of continuous operation.

Further, such a system allows powering of transportation vehicles of different length without requiring addition of emitting elements. Indeed, the range described above provides some tolerance by guaranteeing that at least one emitting element will always be found underneath the receiving device, the receiving area of the latter being within the emission area of the emitting element.

The emitting elements 4 and/or the receiving device 5 are for example made in copper or in any other type of conducting material used for transferring energy by induction. The emitting elements 4 and/or the receiving device 5 operate at very high frequencies, in particular comprised between 20 kHz and 10 MHz and thus give the possibility of meeting power needs of several hundred kilowatts of the transportation vehicle T. The skilled practitioner may adapt the choice of the emitting elements 4 and of the receiving device 5 according to the performances and energy efficiency which he/she wishes to obtain. In particular, the skilled practitioner may suitably determine the intensity of the electromagnetic field of the emitting elements 4.

The power supply system 1 further includes means 6 for electrically powering the emitting elements 4 selectively.

The means 6 include a main electric power supply line 2 which is buried in the ground S and which is preferably located on the side of the rails 9 of the circulation track, as this is seen in FIG. 2. Advantageously, the positioning of the main electric power supply line 2 on the side of the rails 9 (on the left or on the right of the rails 9) makes its implantation in the ground S easier and facilitates the maintenance operations on this line. Alternatively, the main electric power supply line 2 is located between the rails 9 of the circulation track.

The main electric power supply line 2 includes power supply casings 3 electrically connected to the emitting elements 4. The power supply casings 3 correspond to switching modules including switching control inputs 11 connected to the emitting elements 4.

The power supply means 6 formed by the power supply casings 3 and the main electric power supply 2 allow selective powering of one or more of the emitting elements 4 by means of a switching system compliant with the APS system, such as those described for example in applications EP 0 979 176, FR 2 791 930, EP 1 043 187 and EP 2 088 025. These means 6 are therefore laid out so that only the emitting element(s) 4 located under the transportation vehicle T is(are) electrically powered. At the same time, the other emitting elements 4 are not powered and do not emit any electromagnetic field.

The fact that only the emitting elements positioned under the transportation vehicle are powered makes the power supply system according to the invention particularly safe. Indeed the emitting elements are only powered when they are directly below the transportation vehicle, which makes it impossible for an element exterior to the power supply system, in particular a user of the circulation track, to come into contact with or directly pass above active emitting elements inadvertently. On the contrary, the emitting elements which are not positioned under the transportation vehicle and are therefore likely to come into contact with an element exterior to the power supply system, in particular a user of the circulation track, are not electrically powered. The users of the circulation track may thus pass over these non-active emitting elements without any risk.

The transportation vehicle T also includes a storage device 8 powered at least intermittently or even continuously by the receiving device 5. The energy transfer between the receiving device 5 and the storage device 8 is accomplished in a way known per se. The storage device 8 is for example located on the roof of the central body of the transportation vehicle T, as this is seen in FIG. 1. Alternatively, the storage device 8 may be borne by any body of the transportation vehicle T or be formed by an assembly of several storage elements, the distribution of the storage elements either being uniform or not between the bodies of the transportation vehicle T. For example a body may include one or more storage elements or even none of them.

The storage device 8 for example includes an assembly of super capacitors and/or a battery and/or an inertial flywheel.

The operation of the electric power supply system 1 above will now be described.

When the transportation vehicle T arrives above an emitting element 4, its presence is detected by means of at least one presence detector, for example positioned at one end of the transportation vehicle T, and preferably at each of the ends of the transportation vehicle T, and the power supply casing 3 connected to this emitting element 4 provides the electric power supply required for emitting an electromagnetic field via switching control inputs 11 of the power supply casing 3.

In the same way, the power supply casing 3 connected to an emitting element 4 which was located previously underneath the transportation vehicle T and which now is no longer covered by the transportation vehicle T, enables the supply of electric current to this emitting element 4 to be stopped so as to no longer emit an electromagnetic field, because of the end of detection of the presence of the transportation vehicle T above this emitting element 4.

Thus, the emitting elements 4 are powered according to a powering sequence which follows the displacement of the transportation vehicle T.

The arrival and/or the departure of the transportation vehicle T above an emitting element 4 are for example detected by means of presence sensors or detectors such as those described in applications EP 0 979 176, FR 2 791 930, EP 1 043 187 and EP 2 088 025.

The electromagnetic field emitted by an emitting element 4 powered by the power supply means 6 is collected by the receiving device 5 placed under the transportation vehicle T. The thereby collected electric power then allows traction of the transportation vehicle T and/or if necessary powering of the storage device 8.

The storage device 8 in particular allows powering of the transportation vehicle for traction when the latter is in areas without any emitting elements 4 and in the case of a fault of one or several emitting elements 4.

The maintenance and servicing of the power supply system 1 are ensured by facilitated and quick modification and possibly replacement of the faulty emitting element(s) 4 between the passage of two transportation vehicles T without interrupting the traffic and without any perturbation for the immediate environment.

The electric power supply system 1 described above has multiple advantages.

As the energy transfer is accomplished without any contact, problems of wear of the materials are avoided, which allows considerable reduction in the servicing and maintenance costs. Further, by the absence of any contact it is possible to obtain a system providing reliable performances regardless of the weather conditions.

Further, the energy transfer by induction and intermittently when the vehicle passes over the emitting elements allows an entirely insulated and completely safe system, in particular for users of the circulation track, such as pedestrians, cyclists and motorcyclists.

With the induction power supply, it is also possible, by using high frequency electric currents, to suppress the leakage currents usually observed in systems using direct current at 750 volts, and better control the influence of electromagnetic fields on the environment. Further, the reliability of the system is increased by suppressing transient phenomena such as overvoltages or electric arcs, usually causing significant hardware damages.

By using emitting elements with a localised distribution along the circulation track and emitting an electromagnetic field towards the receiving device, it is possible to reduce the energy losses as compared with the systems of the prior art.

Further, the system does not require the use of heavy infrastructures and it may be adapted to an already existing system for powering a vehicle.

In particular, the minimum space occupied by the system on the ground allows it to be adapted onto existing installations without notably and durably interrupting operation and allows increasing the energy efficiency of the system. The maintenance of the system is facilitated in the case of a fault of one of the emitting elements since it is sufficient to only replace the faulty emitting element without interrupting traffic, and this during a very short time interval.

The system moreover exhibits strong interoperability since it may be coupled to an existing overhead power supply system, for example using catenaries. A catenary power supply may be used in areas with low traffic and not very built-up areas without any notable perturbation on the environment, and the ground-based power supply of the system according to the invention may be preferred in high traffic urban areas, for example at crossroads, or in historic sites without disturbing the traffic and the aesthetics of the environment.

With the portions protruding out of the ground of the emitting elements, it is possible to facilitate draining of rain waters by forming natural draining means. Further, as these portions are covered with a protective material, they may withstand possible vertical loads from road machinery.

According to an embodiment, the transportation vehicle does not include any energy storage device of the battery type capable of providing traction energy. Thanks to the continuity of the electric powering of the transportation vehicle, ensured by the presence at each instant of at least one emitting element under the receiving device of the transport vehicle, the power supply system according to the invention may be applied in order to directly provide the traction energy required for operating the transportation vehicle in the absence of any energy storage device.

By using induction, it is possible to ensure continuity of the powering of the transportation vehicle, even if, at a given instant, the emitting element is not exactly vertically directly below to the receiving device, which further increases the reliability of the system. In particular, the emission area of an emitting element and/or the reception area of the receiving device give the guarantee that a receiving element will always receive energy from the emitting element even when these elements are not exactly facing each other, for example when the jointing area between the carriages passes above the emitting element. On the contrary, contact power supply systems require accurate positioning of the current distributing element facing the energy receiving device.

Although the description was made with reference to a railway type vehicle, it is understood that the invention also applies to road transport vehicles such as trucks.

The invention claimed is:

1. A ground-based electric power supply system for a transportation vehicle, the system including:
    a transportation vehicle,
    a plurality of elements emitting an electromagnetic field for powering the transportation vehicle by induction, the plurality of emitting elements being positioned and spaced apart from each other along a circulation track for the transportation vehicle,
    a receiving device for receiving energy emitted by the plurality of emitting elements carried by the transportation vehicle and the receiving device having a length,
    means for electrically powering the plurality of emitting elements selectively, the means for electrically powering being laid out so as to electrically power at least one emitting element when the vehicle is located above the at least one emitting element, and
    wherein the length of the receiving device, measured in a direction of movement of the transportation vehicle along the circulation track, is greater than a distance which separates two consecutive emitting elements along the circulation track.

2. The system according to claim 1, wherein the receiving device extends under the transportation vehicle, in an area of a chassis of the transportation vehicle, and over more than 50% of a length of the chassis, measured in the direction of movement of the vehicle.

3. The system according to claim 2, wherein the receiving device extends under more than 70% of the length of the chassis, measured in the direction of movement of the vehicle.

4. The system according to claim 2, wherein the receiving device extends under between 80 and 100% of the length of the chassis, measured in the direction of circulation of the transportation vehicle.

5. The system according to claim 1, wherein the receiving device consists of a plurality of distinct receiving elements.

6. The system according to claim 1, wherein the distance which separates two consecutive emitting elements is between half and two thirds of the length of the receiving device.

7. The system according to claim 1, wherein the distance which separates two consecutive emitting elements is between 10 and 40 m, and the length of the receiving device is between 20 and 60 m.

8. The system according to claim 1, wherein the means for electrically powering the plurality of emitting elements are laid out so that only the emitting elements located under the transportation vehicle are supplied with electric power.

9. The system according to claim 8, wherein the means for electrically powering the plurality of emitting elements include at least one presence detector for the transportation vehicle in order to detect an arrival or a departure of the transportation vehicle above the at least one emitting element.

10. The system according to claim 9, wherein the at least one presence detector includes on-board elements for emitting a presence signal indicating a presence of the transportation vehicle, positioned at opposite ends of the transportation vehicle and fixed elements for receiving the presence signal positioned in a vicinity of the at least one emitting element.

11. The system according to claim 1, wherein the plurality of emitting elements are at least partly buried into an area of ground and include a portion protruding out of the area of ground.

12. The system according to claim 1, wherein the plurality of emitting elements are located between rails of the circulation track.

13. The system according to claim 1, wherein the transportation vehicle includes at least one storage device powered at least intermittently by the receiving device.

14. The system according to claim 13 wherein the storage device includes an assembly of supercapacitors and a battery and an inertial flywheel.

15. The system according to claim 13 wherein the storage device includes an assembly of supercapacitors.

16. The system according to claim 13 wherein the storage device includes a battery.

17. The system according to claim 13 wherein the storage device includes an inertial flywheel.

18. A method for implementing the power supply system according to claim 1, comprising the steps of:
electrically powering at least one emitting element when the transportation vehicle is located above the at least one emitting element, energy emitted by the at least one emitting element being collected by the receiving device in order to be used to power the vehicle or in order to be stored in a storage device of the transportation vehicle or for powering at least one auxiliary piece of equipment, and
preventing electric powering of the at least one emitting element when the transportation vehicle is not located above the at least one emitting element.

19. A method for maintenance and servicing of a power supply system according to claim 1, including a step consisting of intervening on the system in order to modify or replace at least one electric energy emitting element within a time interval allowing a normal rate of transportation vehicle traffic on the circulation track powered by the system.

* * * * *